United States Patent [19]

Adams

[11] Patent Number: 4,462,249
[45] Date of Patent: Jul. 31, 1984

[54] TANK LEAKAGE DETECTION METHOD

[76] Inventor: Thomas E. Adams, 10509 - 134 St., Edmonton, Alberta, Canada

[21] Appl. No.: 252,212

[22] Filed: Apr. 8, 1981

[30] Foreign Application Priority Data

Mar. 13, 1981 [CA] Canada .................................. 372936

[51] Int. Cl.³ ............................................ G01M 3/24
[52] U.S. Cl. ................................. 73/40.5 A; 73/592; 73/49.2; 73/291
[58] Field of Search .................... 73/40.5 A, 592, 291, 73/49.2, 49.3, 40, 706, 292

[56] References Cited

U.S. PATENT DOCUMENTS

| | | | |
|---|---|---|---|
| 2,912,852 | 11/1959 | Trinneer | 73/49.2 |
| 2,938,383 | 5/1960 | Blackburn | 73/304 R |
| 2,940,302 | 6/1960 | Scherbatskoy | 73/40.5 A |
| 3,915,753 | 10/1975 | Melone | 73/291 |
| 4,176,543 | 12/1979 | Nolte et al. | 73/40.5 A |
| 4,201,081 | 5/1980 | Bonomo | 73/706 X |
| 4,221,418 | 10/1980 | Bonne et al. | 73/706 |

Primary Examiner—Gerald Goldberg
Assistant Examiner—Tom Noland
Attorney, Agent, or Firm—Fleit, Jacobson, Cohn & Price

[57] ABSTRACT

A method and apparatus for detecting perforations in an underground fuel storage tank, employs the creation of a partial vacuum in the tank and a pressure difference across the tank wall, to cause air to pass through the perforation, and a hydrophone to sense the acoustic waves produced by the formation of air bubbles in the fuel. The acoustic waves of the bubbles caused by the air passage are sensed by a hydrophone and processed to provide an electrical signal indicative of the presence of the perforation. A water level sensor is also used to detect the level of water beneath hydrocarbon fuel in the tank. The method and apparatus can also be used with above ground fuel storage tanks and other types of above and below ground storage tanks.

23 Claims, 16 Drawing Figures

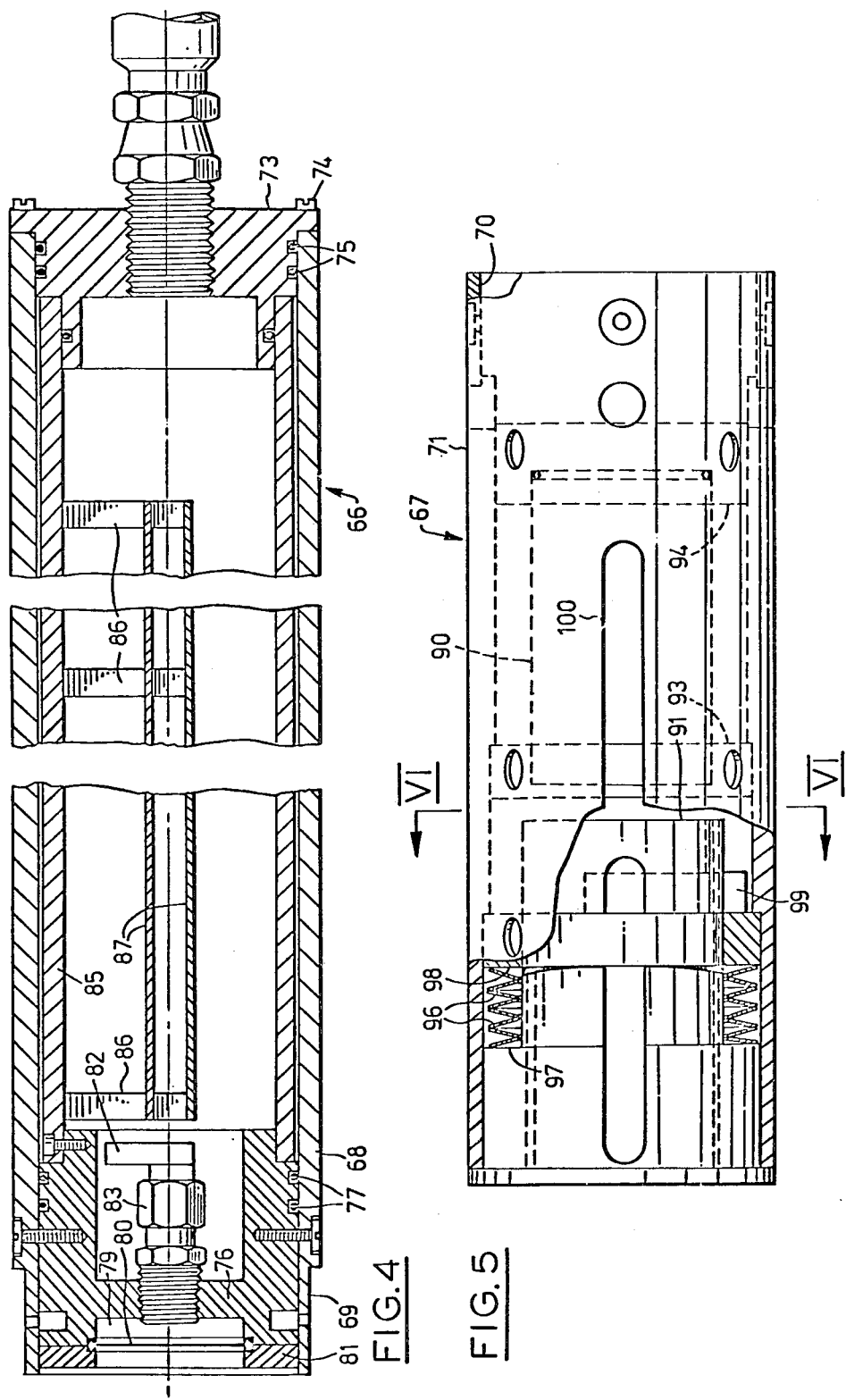

TANK LEAKAGE DETECTION METHOD

FIELD OF THE INVENTION

The present invention relates to a method of and apparatus for detecting a perforation in a tank containing a liquid.

BACKGROUND OF THE INVENTION

Gasoline, diesel fuel and heating oil are the most widely used hydrocarbons and are commonly stored underground at retail service stations, bulk service stations, municipal garages etc. Such liquid hydrocarbons are normally stored in underground tanks and there is a risk that the hydrocarbons may escape into the ground from perforations which develop on the walls of underground storage tanks.

Tank leakage problems are recognized by the petroleum marketing industry and by governmental and environmental agencies.

Furthermore, a leaking tank is generally undiscovered until a flagrant appearance of hydrocarbons is traced to it. The tracing procedure can be long and costly because of factors such as unusual soil strata, a network of backfilled trenches, large and frequent variations in the height of the water table or a dense concentration of underground tanks.

Perforations in tanks usually develop from corrosion; internal corrosion is less prevelant than external corrosion, but does occur especially in a narrow band along the tank bottom. This is because water, which condenses in the air space at the top of the tank is more dense than the hydrocarbon and sinks to form a layer at the bottom of the tank beneath the hydrocarbons. Internal corrosion is aggravated under the fill pipe because protective rust is removed by the flow of liquid against the tank bottom during filling or by the impact and movement of a gauge stick.

DESCRIPTION OF THE PRIOR ART

It has previously been proposed to detect perforations in a tank by detecting the sound generated by the egress of liquid through the perforation and by separating this sound from background noise, which is frequently stronger than the sound being sought.

A method utilizing acoustic detection has been proposed, requiring the use of two or more hydrophones on a rotatable arm. This method was designed primarily for large above-ground tanks and intended to detect, by triangulation and phase correlation, the source of the sound generated by fluid leaking through the perforation. One of the disadvantages of the prior proposal is that, while the passage of fluid through a leak creates random noise the intensity of which increases with pressure, this noise may be lost in background noise when the pressure is only that of the fluid head within the tank. Most underground storage tanks are unable to withstand the high internal pressure of the magnitude required to develop a sound level discernible from background noise by the passage of fluid through a perforation.

OBJECT OF THE INVENTION

It is accordingly an object of the present invention to obviate or mitigate the disadvantages associated with the aforesaid method and apparatus.

BRIEF SUMMARY OF THE INVENTION

According to the present invention, there is provided a method of detecting a perforation in a tank containing a liquid, the method comprising reducing the pressure in the interior of the tank to cause the passage of air into the tank through the perforation due to a static pressure differential between the interior and the exterior of the tank, acoustically sensing the formation of the bubbles of the air in the liquid in the tank converting the acoustic information into an electrical signal and processing the electrical signal to provide an indication of the existence of the perforation.

The formation of a bubble emits a pattern of acoustic energy until it breaks at the liquid surface, and this acoustic energy is sensed by a hydrophone. The pattern of acoustic energy is known as an acoustic signature.

It has been found that, as the bubbles form they become detached from the edge of the perforation, and as they rise towards the surface of the liquid they change shape due to a combination of forces acting on the bubble, and these changes of shape emit acoustic waves on volume pulsation of constant frequency. This volume pulsation results in a characteristic sound signature of a particular frequency and short duration, and these sound signatures can be sensed by a hydrophone immersed within the liquid, identified and distinguished from background noise.

The invention also provides apparatus for detecting a perforation in a tank containing a liquid comprising, means for hermetically sealing the tank where the sensor apparatus is inserted, means for reducing the pressure within the sealed tank to cause the passage of air into the tank through a perforation existing in the tank due to a pressure differential between the interior and the exterior of the tank, means for acoustically detecting the formation of bubbles of the air in the liquid in the tank, and signal processing means for converting the acoustic information to produce an electrical signal, and means for processing the electrical signal to provide an indication of the existence of the perforation.

BRIEF DESCRIPTION OF THE DRAWINGS

The invention will be more readily understood from the following description of a preferred embodiment thereof given, by way of example, with reference to the accompanying drawings in which:

FIGS. 4 and 5 show upper and lower portions, respectively, of a probe shown in FIG. 2;

DESCRIPTION OF THE PREFERRED EMBODIMENT

Figure 1:
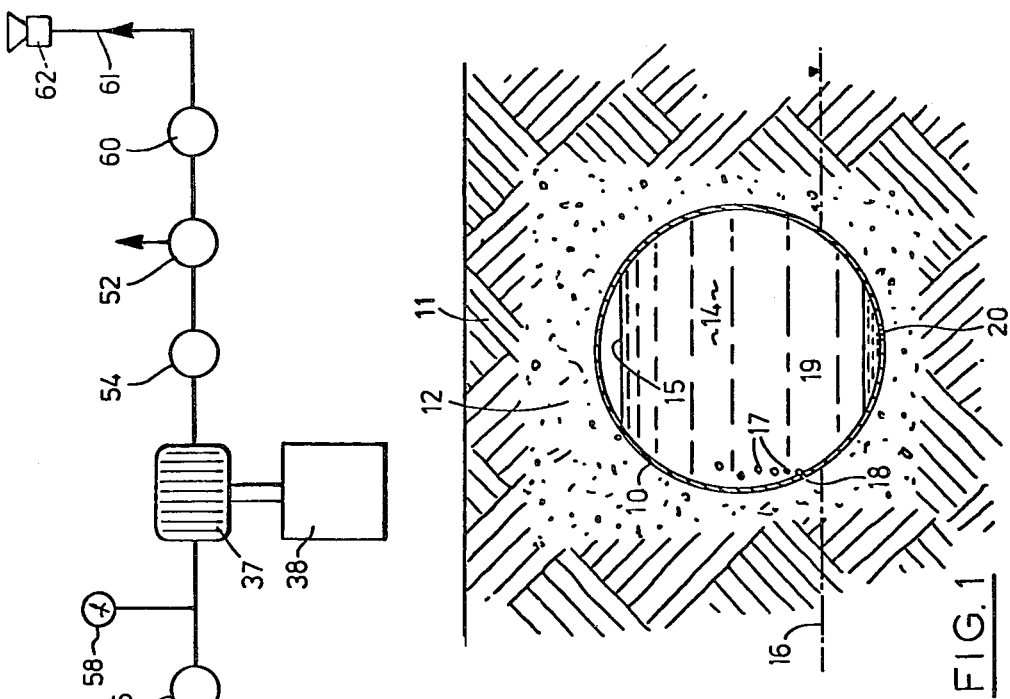
FIG. 1 shows a diagrammatic cross-section through an underground storage tank.

As shown in FIG. 1, an underground fuel storage tank 10 is buried in ground 11 and surrounded by backfill 12.

The tank 10 contains a body 14 of liquid hydrocarbon fuel, for example gasoline, having a liquid surface 15. A water table 16 is present in the ground 11 and the back fill 12.

Bubbles 17 are shown rising from a perforation 18 in the tank 10 above the water table 16 and a body of water 19 is shown below the fuel 14, the water 19 having entered through a perforation 20 in the tank 10 located below the water table 16. It will be appreciated that the fuel 14 will tend to leak outwardly of the tank through the holes 18 and 20 since pressure in the tank 10 is greater than the outside, so that the bubbles 17 will not normally be present, although the condensed water 19 may collect at the bottom of the tank as a result of condensation at the top of the tank, the denser water sinks and collects at the bottom rather than passing through the hole 20. As described in greater detail hereinafter, the present method and apparatus are intended to reduce the pressure within the tank 10 below atmospheric pressure outside the tank in order to deliberately induce the inflow of air in the form bubbles 17 in the liquid therein.

Figure 2:
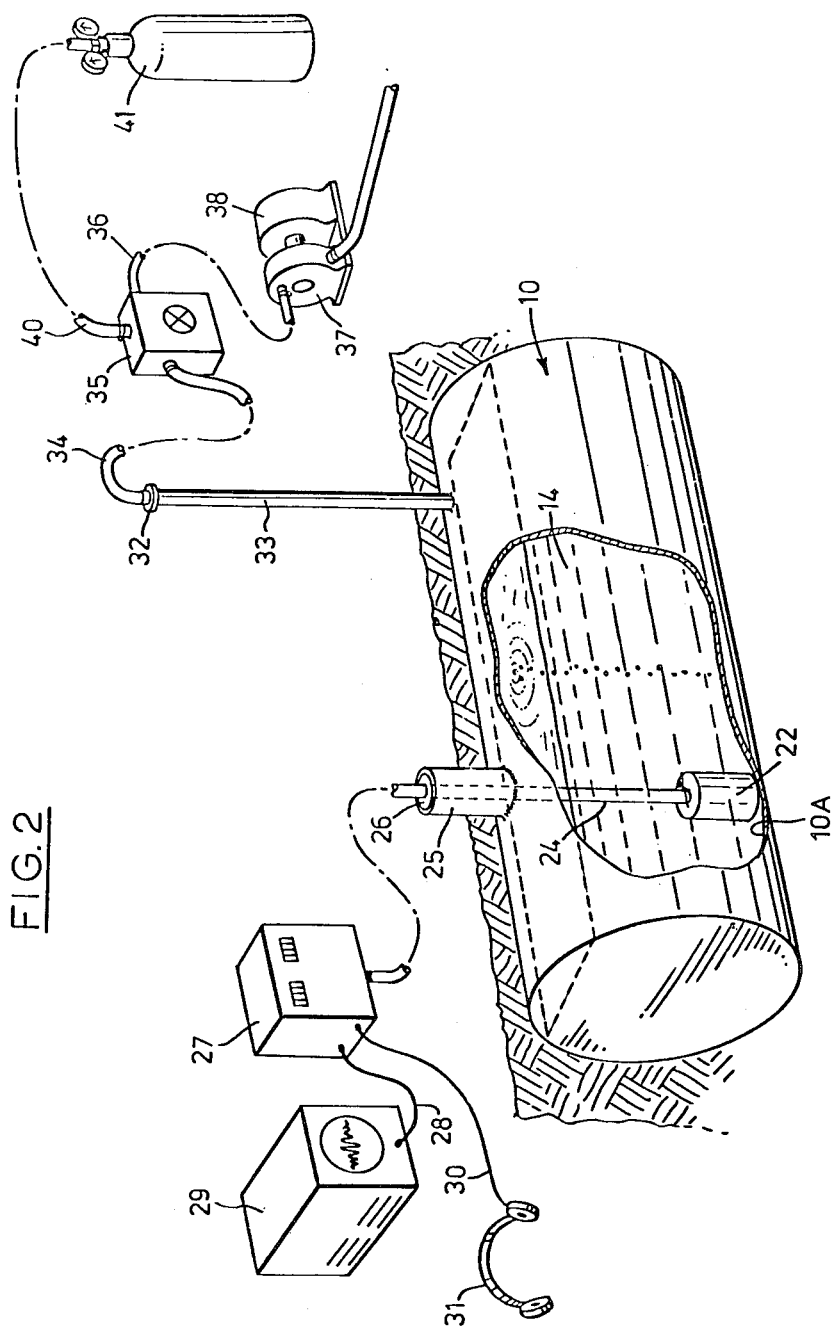
FIG 2 shows a diagrammatic view, in perspective and partly broken away, of the tank of FIG. 1 provided with leakage detecting apparatus embodying the present invention.

Referring now to FIG. 2 a probe 22 is immersed in the tank 10 and located near the bottom 10a.

The probe 22 is suspended within the tank 10 by a cable 24 passing through a fill pipe 25 forming part of the tank 10, the cable 24 is suspended from a closure 26 which hermetically seals the fill pipe 25.

From the closure 26, the cable 24 is connected to a control and display unit 27, which is connected in turn by a cable 28 to an oscilloscope 29 and a cable 30 to a pair of headphones 31.

The tank 10 also includes a vent pipe 33, to which a flexible hose 34 is connected by a coupling 32.

The flexible hose 34 is connected to an evacuation control unit 35, which is in turn connected by a flexible hose 36 to a vacuum pump 37 which is driven by an electric motor 38. The evacuation control unit 35 is also connected by a flexible hose 40 to a gas cylinder 41 containing nitrogen.

As described hereinafter in greater detail, the probe 22 includes a hydrophone, for detecting the acoustic signatures of bubbles, as well as other sensors, each of the sensors being connected through the cable 24 to the control display unit 27.

Figure 3:
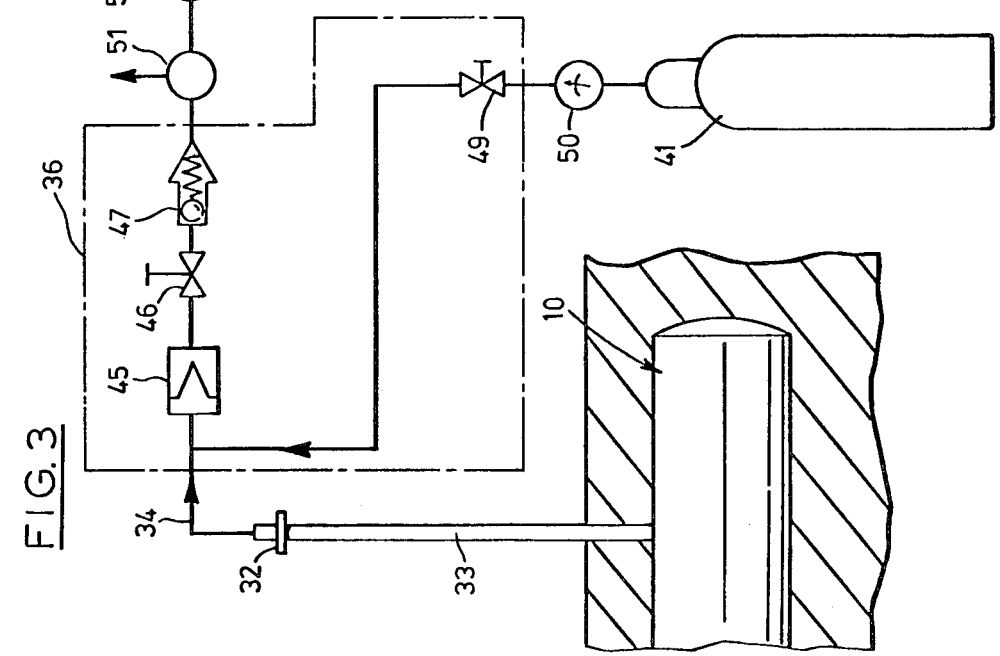
FIG. 3 shows a diagrammatic view, in greater detail, of some parts of the apparatus of FIG. 2.

The various components connected to the vent pipe 33 are shown diagrammatically in greater detail in FIG. 3.

The coupling 32 serves to prevent the entry of atmospheric air into the tank 10 and the hose 34 connects the vent pipe 33 via the evacuation control unit 35 to the pump 37 and to the gas cylinder 41.

The evacuation control unit 35 includes a wire mesh flame arrestor 45, an electrically operated valve 46 and a check valve 47 connected between the hose 34 and the pump 37 and an electrically operated valve 49, which connects the unit 35 to the gas cylinder 41. A pressure regulator 50 is connected between the gas cylinder 41 and the electrically operated valve 49.

The electrically controlled valve 46 is a normally closed valve so that, in case of power failure or disconnection, the connection between the hose 34 and the vacuum pump 37 is automatically interrupted. Closure of the valve 46 enables loss of vacuum to be prevented when the operation of the vacuum pump 37 is interrupted to avoid ground noise interference during operation of the hydrophone as described below.

The check valve 47 serves to prevent flashback to the tank 10, and the electric motor 38 is brushless and controlled by a solid state, arcless switch (not shown) to avoid hazard in the environment of the hydrocarbon storage tank 10.

Pressure sensitive transducers 51 and 52 are provided before and after, respectively, the vacuum pump 37 for sensing the pump inlet and outlet pressures and are connected to the control and display unit 27 and, likewise, temperature sensitive transducers 53 and 54 for sensing the air/fuel vapour mixture at the inlet and outlet of the pump 37 are connected to the control display unit 27. Also, a semi-conductor gas sensor 56 is provided before the inlet to the pump 37 and connected to the control and display unit 27 for providing an indication of the air/fuel vapour ratio of the mixture being pumped by the pump 37, this information together with the temperature measurement of the mixture being used to indicate risk of explosion.

A mechanical pressure gauge 58 is provided immediately before the pump inlet for providing an indication of the pressure of the mixture.

The outlet of the pump 37 is connected through a flow sensor 60 to a portable exhaust stack 61 provided with a flame arrestor 62.

Referring now to FIGS. 4 and 5, which show the probe 22 in greater detail and, more particularly, an upper probe portion indicated generally by reference numeral 66 and a lower probe portion indicated generally by reference numeral 67. The upper probe portion 66 comprises a cylindrical housing 68 having an end portion 69 of reduced cross section for interengagement with a correspondingly widened end portion 70 of a cylindrical housing 71 of the lower housing portion 67.

The cylindrical housing 68 is closed at one end by a closure plug 73, secured by screws 74 and provided with O-ring seals 75 for sealing the closure plug 73 to the internal surface of the cylindrical housing 68.

The opposite end of the cylindrical housing 68 is closed by a diaphragm body member 76, which is sealed to the internal surface of the cylindrical housing 68 by O-ring seals 77.

The outermost end of the body member 76 is formed with an isolation chamber in the form of a cylindrical recess 79, and a diaphragm 80 extends across the recess 79 and is clamped at its periphery by an annular diaphragm cap 81.

A pressure sensitive transducer 82 is exposed to the pressure prevailing in the cylindrical space 79 through a pipe fitting 83, the diaphragm 80 serving to isolate the pressure sensitive transducer 82 from the liquid in the tank 10.

The end closure plug 73 and the diaphragm body member 76 support between them a generally cylindrical inner barrel 85 which, in turn, through radial supports 86 supports a pair of printed circuit boards 87 on which are provided the circuits of the pressure sensitive transducer 82 and the other sensors described hereinafter.

The lower probe housing 67 contains the hydrophone, which is indicated by reference numeral 90 and a water level sensor mounting 91.

The hydrophone 90, which is responsive to sound over an angle of 360° transversely of the longitudinal axis of the probe, is fixedly supported in the lower cylindrical housing 67 by a pair of annular supports 93 and 94.

The water level sensor mounting 91, however, is mounted for limited sliding movement relative to an longitudinally of the lower probe housing 67 and is urged outwardly of the righthand end of the lower probe housing 67, as viewed in FIG. 5, by Belleville springs 96 accommodated between a shoulder 97 on the water level sensor mounting 91 and an annular support member 98, relative to which the water level sensor mounting 91 is slidable.

The Belleville springs 96 serve to absorb shock when the probe 22 is lowered onto the bottom of the tank 10 during the beginning of a test procedure.

A temperature sensor 99 is mounted on an annular support 98 for providing information with respect to the temperature in the tank 10, this information being useful to the operator of the apparatus but not being directly related to the detection of the bubbles, the acoustic signatures of which are not temperature dependent.

The lower probe portion housing 67 is provided with slots extending through the wall thereof, only one of these slots being shown in the drawings and being indicated by reference numeral 100. These slots 100 allow the fuel within the tank 10 to enter the lower probe portion housing 67 and thus allow the acoustic signatures of the bubbles to be detected by the hydrophone.

Figure 6:
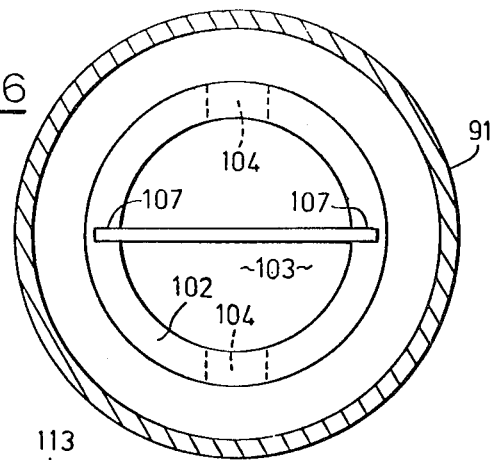
FIG. 6 shows an end view of parts of a water level sensor taken along the line VI—VI of FIG. 5.

FIG. 6 shows an end view of the water level sensor mounting, which has a cylindrical portion 102 defining a hollow interior space 103, the wall 102 being provided with opposed slots 104 through which the fuel in the interior of the tank 10, and any water such as the body of water 19 of FIG. 1, can enter the hollow interior 103.

A printed circuit board 106 extends transversely across the hollow interior 103 and has opposite longitudinal edges thereof received in recesses 107 in the cylindrical wall 102.

Figure 7:
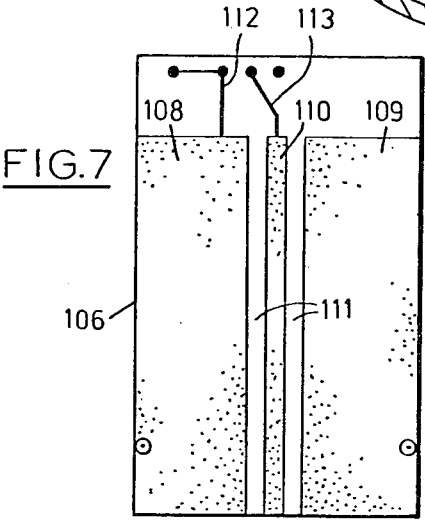
FIGS. 7 and 8 show opposite sides of a printed circuit board forming part of the probe of FIG. 6.
Figure 8:
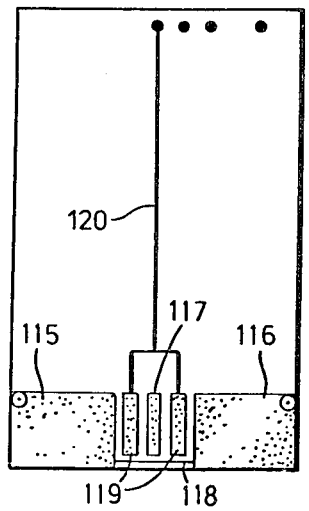

Opposite sides of the printed circuit board 106 are shown in FIGS. 7 and 8.

Referring firstly to FIG. 7, one side of the board 106 has printed thereon three electrodes 108, 109 and 110, the latter being spaced from the electrodes 108 and 109 by gaps 111. Conductors 112 and 113 are provided for connecting the electrodes 108 and 110, respectively, to the circuitry to be described hereinafter.

The opposite side of the board 106 is formed with electrodes 115, 116 and 117 which are interconnected by conductor 118. Electrodes 115 and 116 are also connected through the board to the electrodes 109 and 108, respectively. Electrodes 119 are connected to a conductor 120 for connection, in turn, to the circuitry described hereinafter.

The electrodes 108 and 109, being connected through electrodes 115 and 116 and conductor 118, act as a single electrode spaced by a gap from the electrode 110, which extends parallel to the axis of the probe. Upon immersion of the lower end of the probe 22 in the water 19, the electrical resistance across the gap will vary in accordance with the depth of the water 19. This electrical resistance is calibrated to represent the depth of the water 19. Of course, it is evident that as the water level increases, the electrical resistance measured between the electrodes changes, until the electrodes are completely immersed. Thereafter the reading remains substantially constant.

In order to linearize the variation in this resistance the nature of the inter-electrode spacing is variable.

The electrodes 115, 116 and 117 on the back of the board 106 act as a common first reference electrode, and the electrodes 119 act as a common second reference electrode separated by a reference gap from the first reference electrode. The first and second reference electrodes, and their gap, are located at the lowermost end of the printed circuit board 106 so that, when the water level sensor is in use, these reference electrodes and their gap are disposed below a minimum water level of the body of water 19, the depth of which is to be measured.

Figure 12:
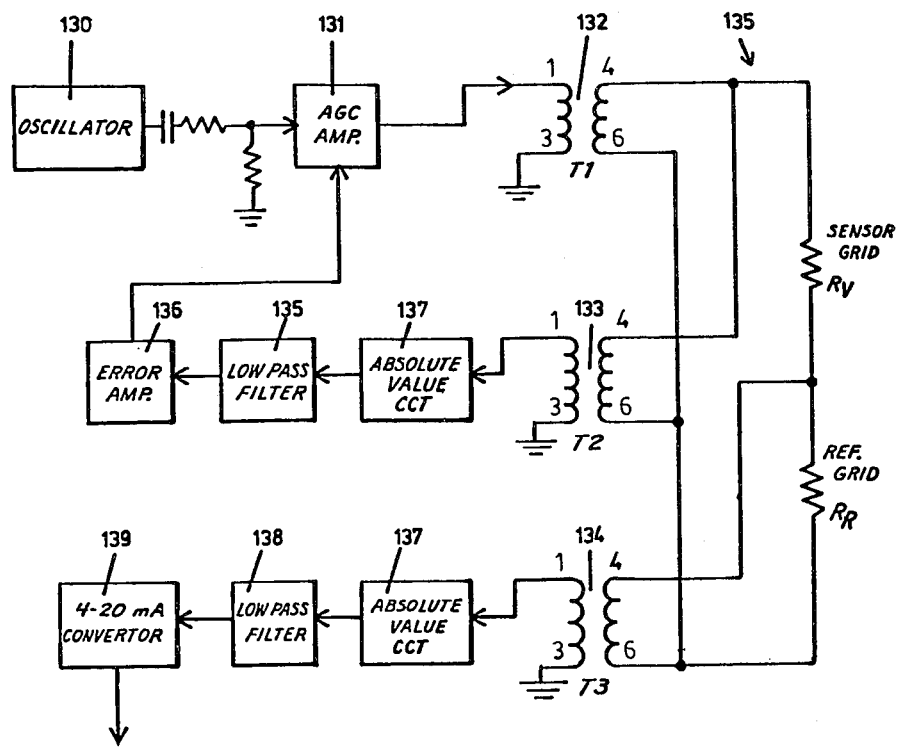
FIG. 12 shows a block circuit diagram of the water level sensor.

FIG. 12 shows a block circuit diagram of the water level sensor, in which the varying resistance of the effective electrode gap at the side of the printed circuit board 106 shown in FIG. 7 is represented by $R_v$ and the resistance of the reference gap at the opposite side of the printed circuit board is represented by $R_r$.

As shown in FIG. 12, the water level sensor circuit includes an oscillator 130 the output of which is connected to a voltage controlled variable gain amplifier 131, which supplies an a.c. voltage to the primary winding of a coupling transformer 132.

The transformer 132 is connected, together with two further coupling transformers 133 and 134 and the resistances $R_v$ and $R_r$, in a bridge circuit indicated generally by reference numeral 135.

The secondary winding of the coupling transformer 133 is connected to an absolute value circuit 134, which converts the sinusoidal AC output signal from the coupling transformer 133 into a full wave rectified signal, which is passed through a low pass filter 135 to an error amplifier 136, the output of which is connected to the variable gain amplifier 131. The voltage fed from the amplifier 131 to the coupling transformer 132 is adjusted to compensate for the variation in the voltage drop across the coupling transformer 132 resulting from changes in the impedance level of the bridge 135.

The secondary winding of the coupling transformer 134 is connected through an absolute value circuit 137 and a low pass filter 138 to a converter 139, which effects output voltage current conversion.

The output of the converter 139 is connected to the control and display unit 27 through the cable 24.

The coupling transformers 132, 133 and 134 isolate the printed circuit board 106 from the remainder of the circuitry of the water level sensor in order to eliminate effects of current leakage from the printed circuit board 106 to ground.

The printed circuit board 106 has its surfaces gold-plated to inhibit corrosion and the buildup of non-conductive films.

The operation of the above-described apparatus is as follows:

The tank 10 is firstly almost filled with the fuel 14, which is then allowed a settling time of 3 or 4 hours to permit any possible emulsification of water and fuel within the tank 10 to dissipate. Emulsification can be produced when the tank is filled due to mixing of the fuel with any water at the bottom of the tank 10 as the fuel is fed into the tank.

The probe 22 is then inserted into the tank 10 through the fill pipe 25 and positioned as shown in FIG. 2, i.e. near the bottom of the tank 10, and the fill pipe 25 is hermetically sealed by the closure 26.

The flexible hose 34 and attached apparatus are connected to the vent pipe 33 by the coupling 32, and the water level gauge in the probe 22 is operated to provide an initial reading indicating the surface level of the body of water 19, if any water is present in the tank 10 at this time.

The pump 37 is then driven in stages by the motor 38 in order to decrease the air/vapour pressure in the ullage in the tank 10 above the fuel surface 15 by discrete amounts.

At each stage, the hydrophone is used to effect an acoustical scan of the interior of the tank 10, with the water level sensor output being continuously monitored and recorded.

The pressure in the tank ullage is reduced incrementally in this way until the pressure difference at the tank bottom, between the interior and the exterior of the tank, is such that the minimum permissible perforation size can be detected.

When the external atmospheric pressure exceeds the combined pressures of the ullage gases and the static head of the fuel 14 above the leakage hole 18, air passes through the perforation, creating bubbles 17.

Figure 14:
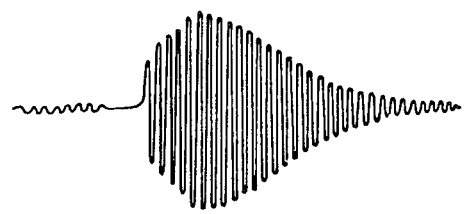
FIGS. 14 and 15 show oscilloscope traces of the acoustic signatures of the formation of bubbles from two different perforations.
Figure 15:
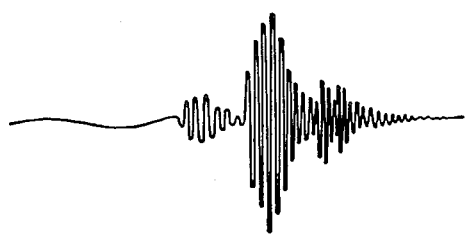

As the bubbles 17 break away from the internal wall surface of the tank 10 they emit the characteristic sounds or acoustic signatures which are detected by the hydrophone, which produces repetitive signals. These acoustic signatures are produced as the formed bubbles change shape as they rise towards the surface. The pressure forces, buoyancy forces and the surface tension of the fuel cause the bubble shape to deform as it rises, and these changes in shape or "volume pulsations" emit acoustic waves which are detected by the hydrophone. These acoustic signatures tend to be constant for a particular perforation, and to differ from perforation to perforation as illustrated in FIG. 14 and FIG. 15. These signals are applied by the control and display unit 27 to the oscilloscope 29 and/or to the headphones 31, where they can be recognized by the operator of the apparatus.

When the tank is at least partly below the level of the water table 16, the difference between interior and exterior pressure may also cause water to pass into the tank through the hole 20, and this is detected as a variation in the level of the body of water 29 by the water level gauge in the probe 22.

When the above-described testing of the tank 10 has been completed, the control unit 35 is operated to discontinue the pumping of air and vapour from the tank ullage and, instead, is used to supply an inert gas from the cylinder 41 into the ullage.

The present method of leakage detection has a number of significant advantages. It is relatively fast, and can be completed within about one hour, which is an economically acceptable time period. Pin hole perforations can be detected as easily as larger perforations and fuel is not expelled from the tank through any perforation during the testing procedure. The relative size of perforations can be deduced from the frequency of the acoustic signatures. The size of a perforation is not increased by the present method, which is also unaffected by mechanical or dimensional instability, it does not require thermal stabilization, fluid agitation or temperature compensation and it is not rendered inoperable by water table fluctuations.

Figure 13:
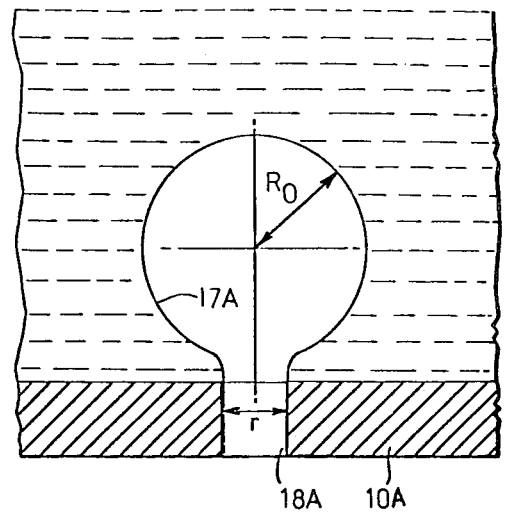
FIG. 13 shows a diagrammatic broken-away cross-section through the part of a tank wall and illustrates the formation of a bubble at a perforation in the tank wall.

Reference is now made to FIG. 13 of the accompanying drawings, which illustrates the formation of a bubble 17A at an ideal, i.e. circular, orifice 18A in a tank wall 10A as air flows into the tank through the orifice 18A.

The minimum pressure difference ($\Delta P$) to form the bubble 17A at the orifice may be expressed as
$\Delta P_{min} = (P_b - P_l)_{min} = 2_r \sigma$ where
$\sigma$ = surface tension of the liquid
r = radius of the orifice 18A
$P_b$ = pressure in the bubble 17A
$P_l$ = static pressure in the liquid at the orifice When the minimum pressure difference required to form the bubble 17A is exceeded, the bubble 17A grows as excess pressure energy is converted into surface energy at the air/liquid interface. Eventually, the buoyancy force acting on the bubble 17A exceeds the surface tension force holding the bubble 17A to the orifice 18A. The equilibrium condition is expresses as $$R_o = \left( \frac{3}{2} \frac{r\sigma}{pg} \right)^{\frac{1}{3}}$$

where
$R_o$ = bubble radius at break away from the perforation
P = density of liquid It will be seen from these equations that the surface tension of the liquid $\sigma$ has a marked effect on the differential pressure required to detach the bubble from the orifice. For a given orifice size, a smaller bubble will be formed in a hydrocarbon than will be formed in water because the ratio of surface tension of water to the surface tension of, say octane is 3.5. Also, the minimum pressure differential required to form a bubble for a given perforation is much higher for water than for a hydrocarbon.

Bubble noise is generated by the volume pulsation of the bubble which occurs immediately after the bubble detaches from the orifice until the bubbles break at the surface of the liquid. Bubbles formed under ideal conditions will exhibit sound due to volume pulsations at frequencies (f) given by the equation $$f = \frac{1}{2\pi} \frac{(3\gamma P_l)}{\rho R_o}^{\frac{1}{2}}$$

$\gamma$ = ratio of specific heat capacity of air at constant pressure, $C_p$ to specific heat capacity at constant volume, $c_v$ (about 1.4). $R_o$ is radius of bubble. Consequently f is inversely proportional to the bubble radius for a given liquid. That is, the bubble repetition rate is a function of the pressure difference across the orifice.

FIGS. 14 and 15 show, by way of example, the acoustic signatures of two tank leakage bubbles in the form of scans on the oscilloscope 29. Such signatures are of overall short duration (approximately 15 ms) and substantially constant volume pulsation frequency and can therefore be distinguished from background noise.

Various modifications may be made to the preferred embodiment without departing from the scope of the invention. For example, although the gas cylinder preferably contains nitrogen it can also be any other inert gas such as carbon dioxide.

Figure 9:
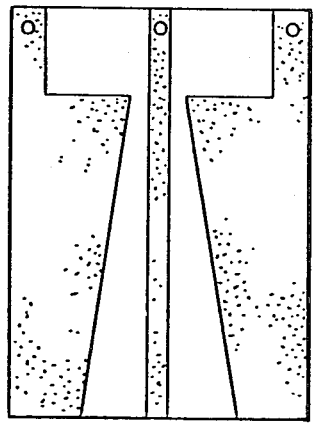
FIGS. 9, 10 and 11 show alternative electrode shapes for the side of the printed circuit board shown in FIG 7.
Figure 10:
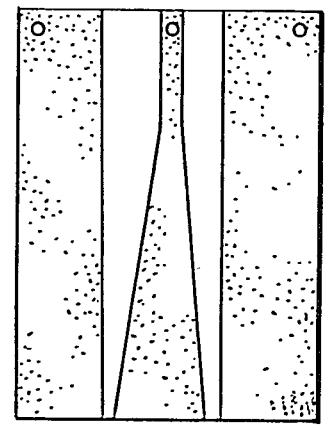
Figure 11:
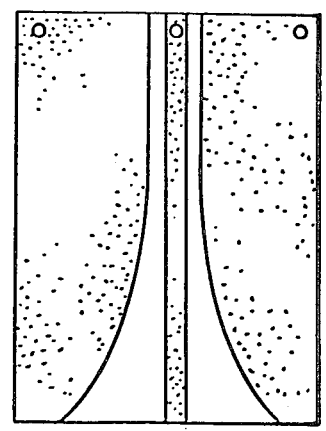

The electrode gap in the preferred embodiment is substantially constant although in fact this need not be the case; FIGS. 9, 10 and 11 illustrate three different tapering inter-electrode gaps which could also be used.

It should also be understood that the present invention is not restricted to the detection of leakage in underground tanks and is equally applicable for use with aboveground tanks.

Figure 16:
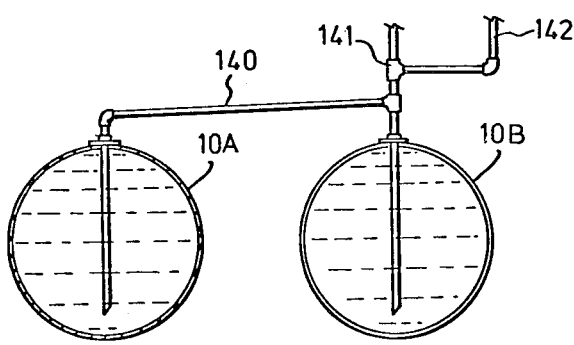
FIG. 16 shows a pair of tanks connected together to a single leakage detecting apparatus.

A pair of tanks containing the same liquid are sometimes connected together as shown in FIG. 16. Two tanks 10A and 10B are connected by a siphon line 140, which is also connected through a check valve 141 to a suction line 142.

When two or more tanks are tested by the above-described method and apparatus it is important to ensure that the same partial vacuum is simultaneously applied to the vent pipe of each tank.

I claim:

1. A method of detecting a perforation in the wall of a tank containing a stored liquid, comprising:
   inserting acoustic sensing means into the tank at an insertion point;
   hermetically sealing the insertion point to be substantially gas-tight,
   reducing the gas pressure in the tank to a level sufficient to produce a pressure difference across the wall of the tank causing fluid to enter the tank, through the perforation;
   detecting the acoustic signal produced by bubbles of said fluid entering said tank from said perforation;
   separating from said signal a component attributable to the volume pulsation of said bubbles; and
   converting said acoustic signal using said separated component to provide a signal indicative of the existence of the perforation.

2. A method as claimed in claim 1 including reducing the pressure in the interior of said tank in successive stages, sensing the formation of bubbles at each of said stages in the stored liquid to produce a plurality of discrete acoustic signals, converting each acoustic signal to an electrical signal, and detecting said component in each of said electrical signals.

3. A method as claimed in claim 1 including sensing the entry of liquid through a perforation by monitoring the level of a body of water beneath the stored liquid in the tank.

4. A method as claimed in claim 1 including restoring the pressure within the tank to atmospheric pressure subsequent to sensing the volume pulsation during the formation of bubbles by inserting an inert gas into the tank.

5. A method of detecting a perforation in a tank containing a stored liquid comprising:
   inserting acoustic sensing means into said tank at an insertion location;
   sealing the insertion location so as to be substantially gas-tight;
   reducing the gas pressure within said tank to a level sufficient to cause a pressure difference between the interior and the exterior of the tank, the pressure difference forcing air to enter the tank through the perforation, the air forming bubbles in the stored liquid, the volume pulsation of said bubble formation producing acoustic wave energy as the bubbles rise from the perforation to the liquid surface;
   using said acoustic sensing means to acoustically sense the volume pulsation during the formation of said bubbles, convering the acoustic wave energy sensed to produce an electrical signal representative of the volume pulsation of said bubbles; and
   processing said electrical signal to provide a signal indicative of the existence of the perforation.

6. A method as claimed in claim 5, including filtering said electrical signal to counteract background noise.

7. A method as claimed in claim 5 or claim 6, wherein the insertion of said acoustic sensing means into said tank comprises lowering a probe through a fill pipe on said tank, said probe including said acoustic sensing means, said method further comprising the step of using said probe to detect the level of a body of water at the bottom of said tank.

8. A method as claimed in claim 5 or 6 including restoring the pressure within the tank to atmospheric pressure subsequent to sensing the volume pulsation during the formation of the bubbles by releasing an inert gas into the tank.

9. A method as claimed in claim 5, which includes detecting the level of water within said tank by immersing a pair of spaced electrodes in the stored liquid and the water, measuring the electrical resistance between said spaced electrodes and comparing the measured value with a reference resistance value, using the difference between the measured and reference values to compute the level of water.

10. A method as claimed in claim 5 including reducing the level of the pressure in discrete steps, said component of said signal produced by volume pulsation during the formation of bubbles being acoustically sensed at each step, and processing the detected electrical signals to determine the sensitivity of the perforation to different pressure differences between the exterior and the interior of the tank.

11. Apparatus for detecting a perforation in the wall of a tank containing a stored liquid, the apparatus comprising:
    means for hermetically sealing to provide a gas-tight seal at an inlet point of said tank;
    means for reducing the gas pressure within said sealed tank sufficient to cause a pressure difference across the wall of the tank, the pressure difference being sufficient to force a fluid to pass into the tank through the perforation in the tank wall;
    acoustic sensing means for sensing the formation of bubbles of said fluid entering the stored liquid in the tank through the perforation, said acoustic sensing means sensing acoustic wave energy produced by the volume pulsation during the formation of bubbles as they rise from the perforation towards the liquid surface, and said acoustic sensing means also converting the acoustic wave energy into an electrical signal;
    means for separating the component of the signal attributable to the volume pulsation of said bubbles; and
    means for detecting and processing said component of the electrical signal to provide an indication of the existence of said performation.

12. Apparatus as claimed in claim 11, wherein said acoustic sensing means includes a probe and means for suspending said probe from the inlet point in the interior of the tank, said probe having a hydrophone responsive to the acoustic wave energy produced by the volume pulsation during the formation of the bubbles.

13. Apparatus as claimed in claim 12, wherein said probe includes means for sensing the pressure in the environment of said probe.

14. Apparatus as claimed in claim 13, wherein said probe has a liquid-tight isolation chamber, a flexible diaphragm forming one wall of said isolation chamber, a second watertight chamber and a passageway connecting said second chamber to said isolation chamber and said pressure sensing means comprise pressure responsive transducer means in said second chamber.

15. Apparatus as claimed in claim 12, wherein said probe includes means sensing the temperature in the environment of said probe.

16. Apparatus as claimed in claim 11 or 12, including a water level sensor for sensing the level of a body of water within said tank, the body of water being disposed below the stored liquid, and means responsive to said water level sensor for providing an indication of the level of the body of water.

17. Apparatus as claimed in claim 16, wherein said water level sensor comprises:
first and second elongate sensing electrodes adapted to be immersed in a generally vertical direction in the stored liquid, with ends of the first and second sensing electrodes being disposed lowermost;
said first and second sensing electrodes defining an elongate gap therebetween;
first and second reference electrodes spaced apart to define a reference gap therebetween;
said first and second reference electrodes being located in the vicinity of said lowermost ends of the first and second sensing electrodes; and
means for measuring the difference between electrical resistance across said sensing gap and across said reference gap, the difference being a function of the length of said sensing gap which is immersed in the water.

18. Apparatus as claimed in claim 17, wherein said measuring means includes means for applying an a.c. voltage to said first sensing electrode to counteract polarization of said electrodes.

19. Apparatus as claimed in claim 16, further including means for resiliently supporting said acoustic sensing means on the bottom of said tank.

20. Apparatus as claimed in claim 11 or 12, including pressure sensitive means for sensing pressure at the bottom of the interior of said tank and means responsive to said pressure sensitive means for providing an indication of said pressure.

21. Apparatus as claimed in claim 11, wherein said gas pressure reducing means comprises means for pumping gas from the ullage of the tank, duct means for connecting said pumping means to said tank; check valve means for preventing return flow of said gas along said duct means to said tank and spark arrestor means for preventing combustion of said gas through said duct means.

22. Apparatus as claimed in claim 21, further including vent means for venting to the atmosphere said gas pumped from said ullage, the spark arrestor means being associated with said vent means for preventing explosion therein.

23. Apparatus as claimed in claim 11, further including means for supplying an inert gas into said tank after the sensing of the formation of said bubbles.

* * * * *